(12) United States Patent
Imaizumi (10) Patent No.: US 11,368,621 B2
(45) Date of Patent: Jun. 21, 2022

(54) IMAGE CAPTURING APPARATUS (71) Applicant: CANON KABUSHIKI KAISHA, Tokyo (JP)

(72) Inventor: Takuya Imaizumi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/128,940

(22) Filed: Dec. 21, 2020

(65) Prior Publication Data
US 2021/0203849 A1 Jul. 1, 2021

(30) Foreign Application Priority Data

Dec. 25, 2019 (JP) .............................. JP2019-233631
Oct. 12, 2020 (JP) .............................. JP2020-172038

(51) Int. Cl.
*H04N 5/232* (2006.01)
*H04N 5/225* (2006.01)
*H01Q 1/24* (2006.01)

(52) U.S. Cl.
CPC ........... *H04N 5/23258* (2013.01); *H01Q 1/24* (2013.01); *H04N 5/22525* (2018.08); *H04N 5/23287* (2013.01)

(58) Field of Classification Search
CPC .......... H04N 5/23258; H04N 5/22525; H04N 5/23287; H04N 5/2251; H01Q 1/24
See application file for complete search history.

(56) References Cited

U.S. PATENT DOCUMENTS 7,327,396 B2 * 2/2008 Schultz .............. H04N 5/23225
348/375

2003/0193571 A1 10/2003 Schultz et al.

FOREIGN PATENT DOCUMENTS

| JP | 2005-065090 A | 3/2005 |
|---|---|---|
| JP | 2018-060160 A | 4/2018 |
| WO | 2006/005129 A | 1/2006 |

OTHER PUBLICATIONS

The above patent documents were cited in a European Search Report dated May 10, 2021, which is enclosed, that issued in the corresponding European Patent Application No. 20209965.1.

* cited by examiner

*Primary Examiner* — Timothy J Henn
*Assistant Examiner* — Angel L Garces-Rivera
(74) *Attorney, Agent, or Firm* — Cowan, Liebowitz & Latman, P.C.

(57) ABSTRACT

The image capturing apparatus includes a communication unit configured to perform wireless communication, and a shake detection unit including a sensor configured to detect shake of the image capturing apparatus. The communication unit and the shake detection unit are both disposed in a same accommodation area provided in the image capturing apparatus, the accommodation area being located away from an image capturing optical axis. In the accommodation area, at least one if the following conditions is satisfied: an image capturing optical axis-side surface of the communication unit is disposed at a position farther than an image capturing optical axis-side surface of the shake detection unit; and an image plane-side surface of the communication unit is disposed on an object side further from the image capturing optical axis than an image plane-side surface of the shake detection unit.

18 Claims, 8 Drawing Sheets

IMAGE CAPTURING APPARATUS

BACKGROUND OF THE INVENTION

Field of the Invention

The present invention relates to an image capturing apparatus (hereinafter, referred to as "a camera") having a shake detection unit.

Description of the Related Art

Cameras are provided, each of which includes a shake detection unit constituted by a gyro sensor or the like, and performs image blur correction (image stabilization) operation depending on camera shake detected by the shake detection unit. In such cameras, vibration generated by operation of a shutter (hereinafter referred to as "shutter vibration") may be detected by the shake detection unit, which may cause erroneous image stabilization operation. Japanese Patent Laid-Open No. 2018-60160 discloses a camera that holds a shake detection unit by using a cushioning material such that shutter vibration is less likely to be transmitted to the shake detection unit.

On the other hand, cameras are provided, each of which includes a wireless communication unit such that a captured image can be sent to the outside by wireless communication. The wireless communication unit is normally disposed in a space whose outside is rarely covered by a user's hand in various camera postures; the space is located in the camera on an object side further than a viewfinder.

However, even if the shake detection unit is held by using the cushioning material as in the camera disclosed in Japanese Patent Laid-Open No. 2018-60160, if distance between the shake detection unit and the shutter is short, the shutter vibration insufficiently attenuated by the cushioning material is transmitted to the shake detection unit. In this case, it is desirable to dispose the shake detection unit together with the wireless communication unit in the space located on the object side further than the viewfinder such that the distance from the shutter is sufficiently long.

However, disposing both the wireless communication unit and the shake detection unit in the space may increase a size of a part on the object side further than the viewfinder in the camera.

BRIEF SUMMARY OF THE INVENTION

The present invention provides an image capturing apparatus in which a shake detection unit and a wireless communication unit can be compactly arranged together, and that is capable of satisfactorily performing shake detection and wireless communication.

The present invention provides as an aspect thereof an image capturing apparatus configured to capture an image of an object. The image capturing apparatus includes a communication unit configured to perform wireless communication, and a shake detection unit including a sensor configured to detect shake of the image capturing apparatus. The communication unit and the shake detection unit are both disposed in a same accommodation area provided in the image capturing apparatus, the accommodation area being located away from an image capturing optical axis. In the accommodation area, at least one of the following conditions is satisfied: an image capturing optical axis-side surface of the communication unit is disposed at a position farther than an image capturing optical axis-side surface of the shake detection unit; and an image plane-side surface of the communication unit is disposed on an object side further from the image capturing optical axis than an image plane-side surface of the shake detection unit.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

Embodiment 1

Figure 1:
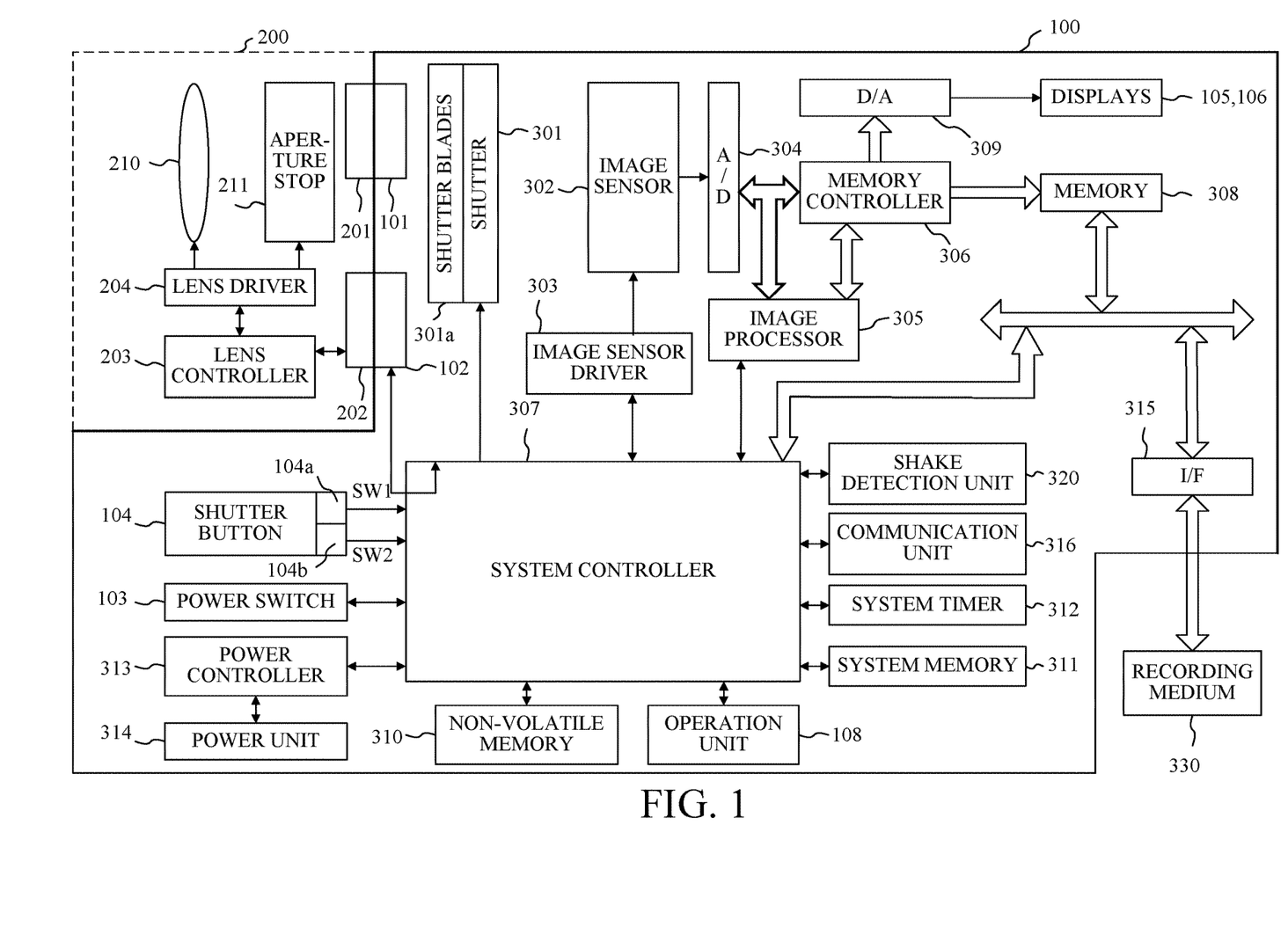
FIG. 1 is a block diagram illustrating a configuration of a camera that is Embodiment 1 of the present invention.
Figure 2:
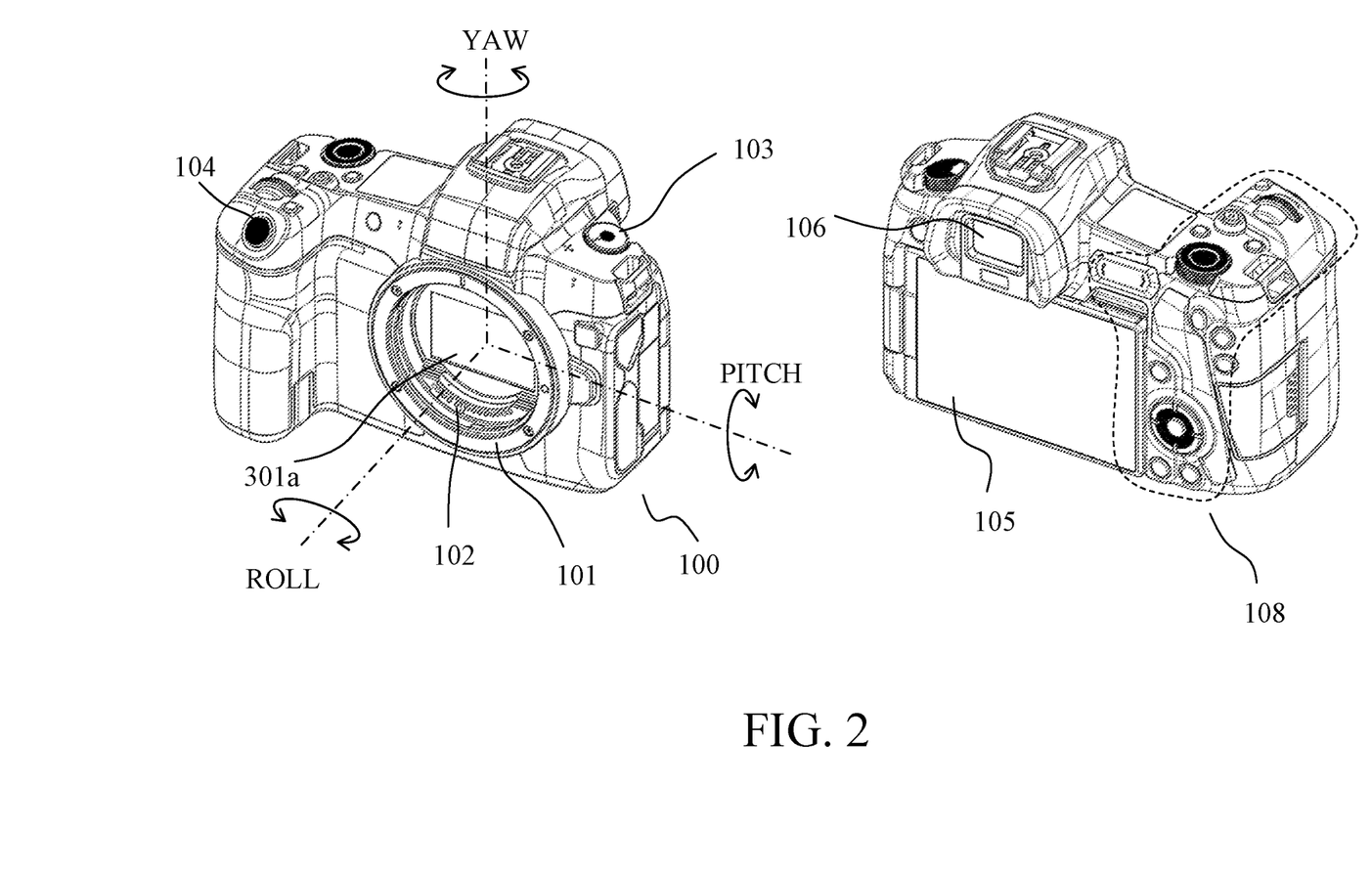
FIG. 2 is a perspective view of the camera of Embodiment 1.

Description will be made of a digital camera (hereinafter simply referred to as "a camera") 100 as an image capturing apparatus that is a first embodiment (Embodiment 1) of the present invention with reference to FIGS. 1 to 6. FIG. 1 illustrates a configuration of the camera 100. FIG. 2 illustrates an exterior view of the camera 100. The camera 100 is a lens-interchangeable camera to which an interchangeable lens unit 200 illustrated in FIG. 1 is detachably attached. A lens mount 201 provided in the interchangeable lens unit 200 is bayonet-coupled to a camera mount 101 provided in the camera 100, and thereby the interchangeable lens unit 200 is attached to the camera 100.

In the camera 100, an image sensor 302 constituted by a CCD sensor, a CMOS sensor, or the like captures an optical image (object image) formed by an image capturing optical system in the interchangeable lens unit 200, and converts the optical image into an electric signal (analog image capturing signal). A shutter 301 disposed on a front side (object side) of the image sensor 302 blocks light entering the image sensor 302 in a non-image capturing state, and opens and closes during image capturing to control an exposure amount of the image sensor 302.

An A/D converter 304 converts the analog image capturing signal output from the image sensor 302 into a digital image capturing signal, and outputs it to an image processor 305 and a memory controller 306. The image processor 305 performs a pixel interpolation process, a resizing process, a color conversion process, and an AWB (auto white balance) process on the digital image capturing signal input from the A/D converter 304 or the memory control unit 306 to generate recording or displaying image data. Further, the image processor 305 performs various calculation processes using the generated image data. A system controller 307 performs an AF (autofocus) process and an AE (automatic exposure) process using the calculation results obtained by the image processor 305.

Figures 4A, 4B:
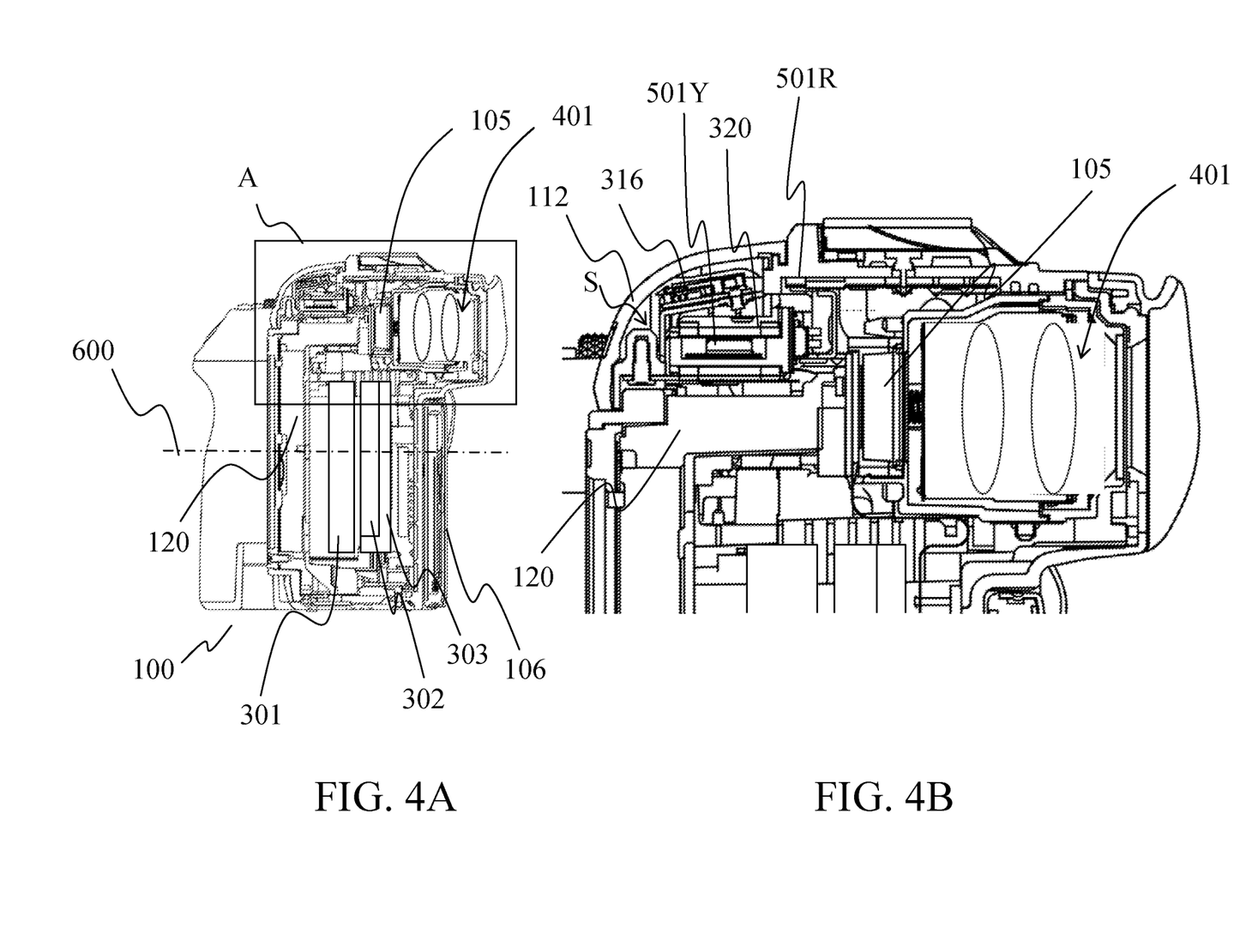
FIGS. 4A and 4B are sectional views of the camera of Embodiment 1.

The memory control unit 306 writes the image data to a memory 308. The memory 308 also serves as an image display memory (video memory). A D/A converter 309 converts the displaying image data written in the memory 308 into an analog image signal, and supplies it to a viewfinder display 105 or a rear display 106. As a result, an image corresponding to the displaying image data written in the memory 308 is displayed as a live-view image on the viewfinder display 105 or the rear display 106, and a confirmation image corresponding to the recording image data is displayed on the viewfinder display 105 or the rear display 106. The viewfinder display 105 and the rear display 106 are constituted by a display device such as an LCD. The viewfinder display 105 is disposed in a viewfinder 401 as illustrated in FIGS. 4A and 4B, thereby enabling a user looking into the viewfinder 401 to observe an object.

A non-volatile memory 310 constituted by an EEPROM or the like stores constants, programs, and the like for operation used by a system controller 307. The system controller 307 has at least one processor, and controls the camera 100 and the interchangeable lens unit 200. A system memory 311 constituted by RAM stores constants and variables for operation of the system controller 307, and develops a program read from the non-volatile memory 310. The system controller 307 also performs image display control by controlling a memory 308, the D/A converter 309, the viewfinder display 105, and the rear display 106.

A system timer 312 measures a current time and times used for various controls. A first shutter switch 104a is turned on by a user's half-press operation (image capturing preparation instruction) of a shutter button 104 provided on the camera 100 to generate a first shutter switch signal SW1. The system controller 307 starts, in response to the first shutter switch signal SW1, an image preparation process including the AF process, the AE process, and the AWB process. A second shutter switch 104b is turned on by a user's full-press operation (image capturing instruction) to generate a second shutter switch signal SW2. In response to the second shutter switch signal SW2, the system controller 307 starts an image capturing process including control of opening and closing of shutter blades 301a provided in the shutter 301, read-out of the image capturing signal from the image sensor 302, writing of the recording image data to a recording medium 330, and the like.

The shutter blades 301a move at high speed in the shutter 301 in a direction orthogonal to an optical axis of the image capturing optical system (hereinafter referred to as "an image capturing optical axis) and stops instantaneously by hitting a stopper member (not illustrated) in the shutter 301. An impact generated by the hit of the shutter blades 301a against the stopper member causes the entire shutter 301 to vibrate in the direction orthogonal to the image capturing optical axis, which is the same direction as the movement direction of the shutter blades 301a. The vibration generated in the shutter 301 (hereinafter referred to as "shutter vibration") is transmitted to a main body 120 described later to which the shutter 301 is screwed, and further to the system controller 307 screwed to the main body 120 and a top cover unit 110 described later, and the like.

An operation unit 108 includes buttons and dials operated by the user, touch panels provided on the displays 105 and 106, and the like.

A power switch 103 is operated by the user to turn power of the camera 100 on and off. A power controller 313 is constituted by a battery detection circuit, a DC-DC converter, a switch circuit that switches a block to be energized, and the like, and detects whether or not a battery is installed, the type of the installed battery, and a remaining battery level. Further, the power controller 313 controls the DC-DC converter based on the detection result and an instruction from the system controller 307 to supply a necessary voltage to each of parts including the recording medium 330 for a necessary time period.

A power unit 314 is constituted by a primary battery, a secondary battery, an AC adapter, and the like. A recording medium I/F 315 is an interface with the recording medium 330 such as a memory card or a hard disk. The recording medium 330 is a memory card, a hard disk, a semiconductor memory, an optical disk, a magnetic disk, or the like that record the recording image data.

A wireless communication unit (hereinafter simply referred to as "a communication unit") 316 performs wireless communication with an external device to send transmit and receive the displaying and recording image data and audio data, and various other information to and from the external device. The communication unit 316 is also connectable to a wireless LAN (Local Area Network) and the Internet.

The system controller 307 of the camera 100 and a lens controller 203 of the interchangeable lens unit 200 communicate with each other via a connector 102 provided in the camera 100 and a connector 202 provided in the interchangeable lens unit 200. The system controller 307 sends a focus command signal and a stop command signal to the lens controller 203, and the lens controller 203 that receives these command signals drives a focus lens 210 and an aperture stop 211 included in the image capturing optical system via a lens driver 204.

A shake detection unit 320 is configured by using a gyro sensor or the like, and detects vibration of the camera 100 (hereinafter referred to as "camera shake") in three axial directions illustrated in FIG. 2: a pitch direction around a pitch axis, a yaw direction around a yaw axis, and a roll direction around a roll axis. The shake detection unit 320 outputs a signal indicating an angular velocity of the camera shake, and the system controller 307 calculates a magnitude of the camera shake (hereinafter referred to as "a camera shake amount") from the angular velocity signal.

An image sensor driver 303 moves the image sensor 302 in a plane orthogonal to the image capturing optical axis depending on the calculated camera shake amount to perform optical image blur correction (optical image stabilization). Further, the image processor 305 performs electronic image blur correction (electronic image stabilization) by moving a clipping area from the image data depending on the camera shake amount.

Figure 3:
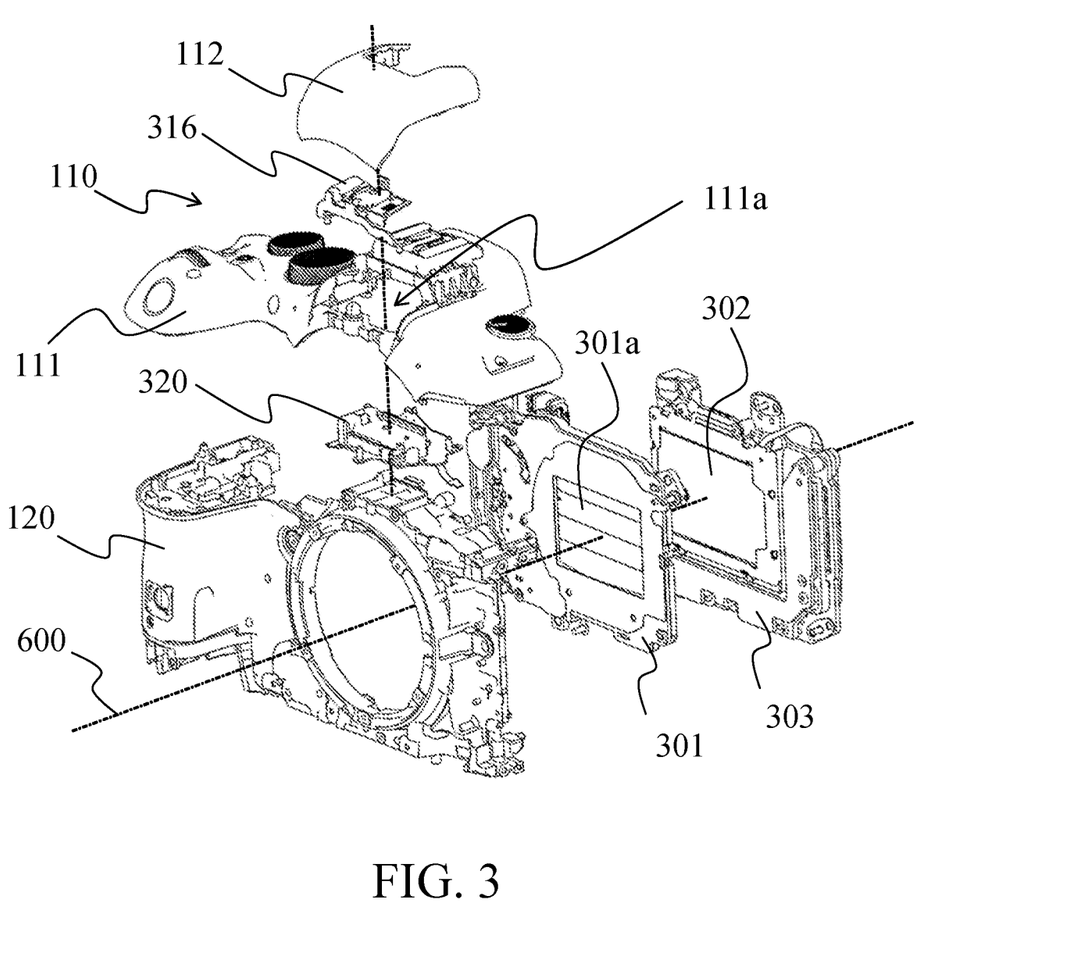
FIG. 3 is an exploded perspective view of the camera of Embodiment 1.

FIG. 3 illustrates a part of the camera 100 in an exploded manner. Reference numeral 600 denotes the image capturing optical axis. The main body 120 is a structural member (chassis) that ensures strength of the camera 100. The shutter 301, the image sensor driver 303 and a substrate on which the system controller 307 illustrated in FIG. 1 is mounted are screwed to the main body 120. The top cover unit 110 is screwed to an upper part of the main body 120. The shake detection unit 320 is screwed to the top cover unit 110 from inside. The communication unit 316 is screwed to the top cover unit 110 from outside.

A top cover 111 of the top cover unit 110 is made of a highly conductive material (carbon-containing resin, magnesium alloy, etc.) as a countermeasure for the camera 100 against electromagnetic noise. It is impossible to cover the communication unit 316 with a highly conductive material because of wireless communication with the outside. Therefore, the top cover 111 has an opening 111a inside which the communication unit 316 is disposed, and an antenna cover 112 made of a non-conductive material is screwed to the top cover unit 110 so as to cover the communication unit 316 disposed inside the opening 111a.

FIG. 4A illustrates a section of the assembled camera 100 cutting along the image capturing optical axis 600. FIG. 4B illustrates a part A in FIG. 4A in an enlarged manner. As illustrated in these figures, the communication unit 316 and the shake detection unit 320 are accommodated in a same accommodation area S as a space surrounded on three sides by the main body 120, the antenna cover 112 and the viewfinder 401 (or the viewfinder display 105).

The accommodation area S is an area surrounded by the top cover 111 as a first exterior member that covers a portion of the camera 100 except the communication unit 316 and the shake detection unit 320, and an antenna cover 112 as a second exterior member that is attached to the top cover 111 to cover the communication unit 316 and the shake detection unit 320. Furthermore, the communication unit 316 and the shake detection unit 320 are disposed in the accommodation area S that is an upper front area in the camera 100, the area being located on the object side further than the viewfinder 401 and being farther from the image capturing optical axis 600 than the main body 120. The communication unit 316 and the shake detection unit 320 are arranged one above the other so as to be close (adjacent) to each other.

In the accommodation area S, the communication unit 316 is disposed at a position farther than the image capturing optical axis 600 than the shake detection unit 320. The shake detection unit 320 has a flexible substrate that, as described later, has conductivity and thereby hinders wireless communication. Therefore, such an arrangement enables good wireless communication without being hindered by the flexible substrate. In this embodiment, the communication unit 316 and the shake detection unit 320 are arranged so as to be close to each other in an up-and-down direction as described above. However, the communication unit 316 may be disposed at a position on the object side further than the shake detection unit 320.

Figures 5A, 5B:
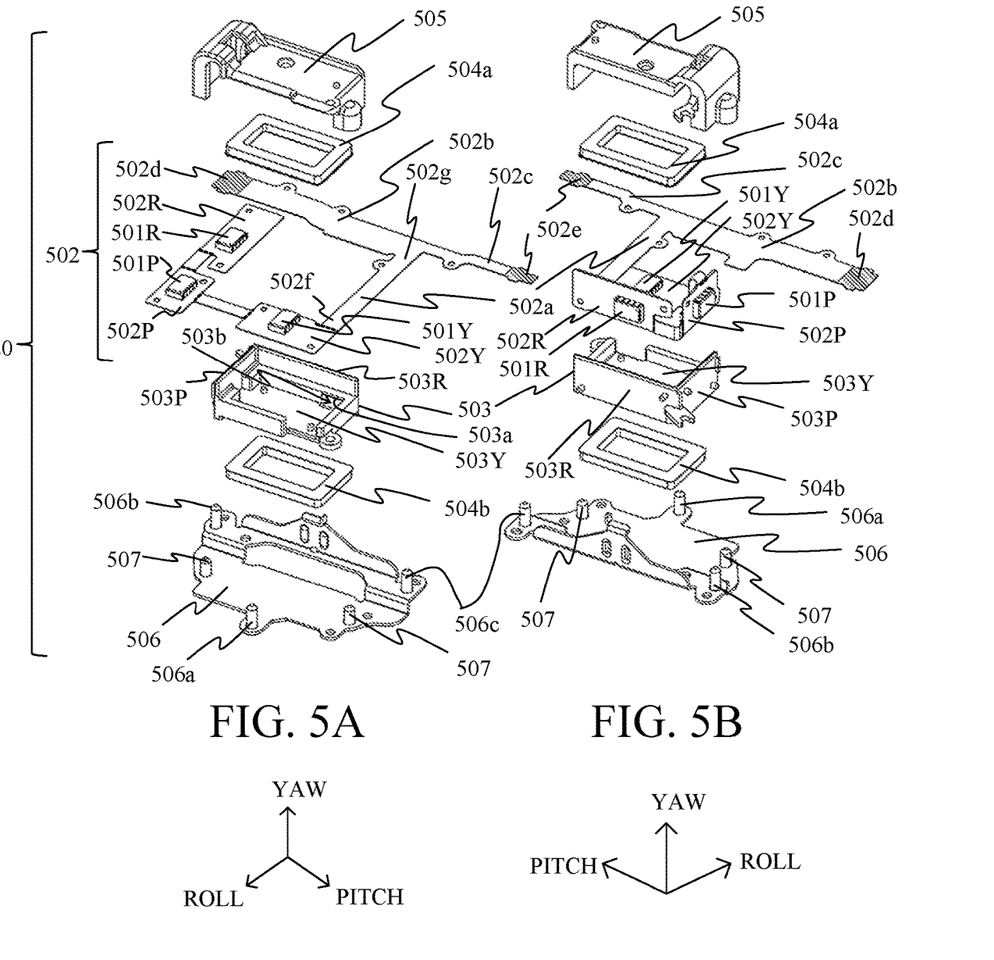
FIGS. 5A and 5B are exploded perspective views of a shake detection unit included in the camera of Embodiment 1.

FIG. 5A illustrates the shake detection unit 320 in an exploded manner as viewed from the front side. FIG. 5B illustrates the shake detection unit 320 illustrated in FIG. 5A as viewed from a rear side. FIG. 5A illustrates a first flexible substrate 502 before bending, and FIG. 5B illustrates the first flexible substrate 502 after bending.

The shake detection unit 320 has gyro sensors 501Y, 501R and 501P that are mounted on the first flexible substrate 502, and are capable of detecting angular velocities in the above-described around-axis directions (yaw, pitch and roll directions) orthogonal to a mount surface of the first flexible substrate 502. The gyro sensor 501Y corresponds to a first sensor, and the gyro sensors 501R and 501P each correspond to a second sensor.

The first flexible substrate 502 has three islands: a yaw island (first mount surface) 502Y, a roll island (second mount surface) 502R, and a pitch island (second mount surface) 502P. The yaw island 502Y, the roll island 502R and the pitch island 502P are each reinforced by a reinforcing plate (not illustrated), and are each connected to another part of the first flexible substrate 502 via a wiring portion. The gyro sensor 501Y is mounted on the yaw island 502Y, the gyro sensor 501R is mounted on the roll island 502R, and the gyro sensor 501P is mounted on the pitch island 502P.

A holding member 503 is a member for holding the gyro sensors 501Y, 501R and 501P mounted on the first flexible substrate 502 at predetermined positions, and is made of plastic or the like. The holding member 503 has a yaw holding surface 503Y orthogonal to the yaw axis, a roll holding surface 503R orthogonal to the roll axis, and a pitch holding surface 503P orthogonal to the pitch axis. The yaw island 502Y of the first flexible substrate 502 is held by the yaw holding surface 503Y of the holding member 503, and thereby the gyro sensor (first sensor) 501Y is held by the holding member 503 such that its angular velocity detection axis (first axis) coincides with the yaw axis. The roll island 502R is held by the roll holding surface 503R, and thereby the gyro sensor (second sensor) 501R is held by the holding member 503 such that its angular velocity detection axis (second axis) coincides with the roll axis.

The pitch island 502P is held by the pitch holding surface 503P, and thereby the gyro sensor (second sensor) 501P is held by the holding member 503 such that its angular velocity detection axis (second axis) coincides with the pitch axis. In this way, the gyro sensor 501Y is disposed so as to be capable of detecting the camera shake in the yaw direction, the gyro sensor 501R is disposed so as to be capable of detecting the camera shake in the roll direction, and the gyro sensor 501P is disposed so as to be capable of detecting the camera shake in the pitch direction.

Although in this embodiment three one-axis gyro sensors are used, a two-axis gyro sensor and a one-axis gyro sensor may be used.

The holding member 503 and the first flexible substrate 502 are mutually firmly fixed with an adhesive member such as a double-sided adhesive tape or a bond, or with fastening member such as a screw at the vicinity of the gyro sensors 501Y, 501R and 501P such that the position of each gyro sensor does not change with respect to the holding member 503. Since image stabilization control is performed based on the signal output from the shake detection unit 320, a change in relative angle between the camera 100 and the gyro sensors 501Y, 501R and 501P makes it impossible to perform correct image stabilization. Therefore, by firmly fixing the gyro sensors 501Y, 501R and 501P to the holding member 503, the relative angle between the camera 100 and the gyro sensors 501Y, 501R and 501P is kept, thereby making it possible to perform good image stabilization control.

A first cushioning member 504a and a second cushioning member 504b are each made of a viscoelastic material such as a sponge that can absorb vibration, and are disposed so as to contact mutually oppositely facing surfaces (upward and downward surfaces) of the holding member 503. In this embodiment, in the up-and-down direction in which the yaw axis extends (hereinafter referred to as "a yaw axis direction"), in order from the upper side, a first pressing member 505, the first cushioning member 504a, the holding member 503, the second cushioning member 504b, and a second pressing members 506 are arranged.

The first pressing member 505 and the second pressing member 506 sandwich the holding member 503 via the first cushioning member 504a and the second cushioning member 504b so as not to contact the holding member 503, and are fixed by 507. The first pressing member 505 and the second pressing member 506 each correspond to a base member of the shake detection unit 320.

As described above, the shutter vibration is transmitted to the top cover unit 110. However, when this shutter vibration is transmitted to each gyro sensor of the shake detection unit 320 held by the top cover unit 110, a shutter vibration component is superimposed on the output from each gyro sensor, which may make it impossible to correctly detect original camera shake due to hand jiggling or the like.

On the other hand, in this embodiment, since each gyro sensor is held by using the first and second cushioning members 504a and 504b described above, the shutter vibration transmitted from the shutter 301 to the top cover unit 110 is attenuated by the first and second cushioning members 504a and 504b, which makes it possible to correctly detect the camera shake by the shake detection unit 320.

An extending portion 502a is formed in the first flexible substrate 502 in the vicinity of the gyro sensor 501Y, and extending portions 502b and 502c extend in mutually different directions from the extension portion 502a. At ends of the extending portions 502b and 502c, connection terminals 502d and 502e for connecting to main body connectors (not illustrated) are provided. The angular velocity signals from the gyro sensors 501Y, 501R and 501P are output to the system controller 307 via the connection terminals 502d and 502e.

Figures 6A, 6B:
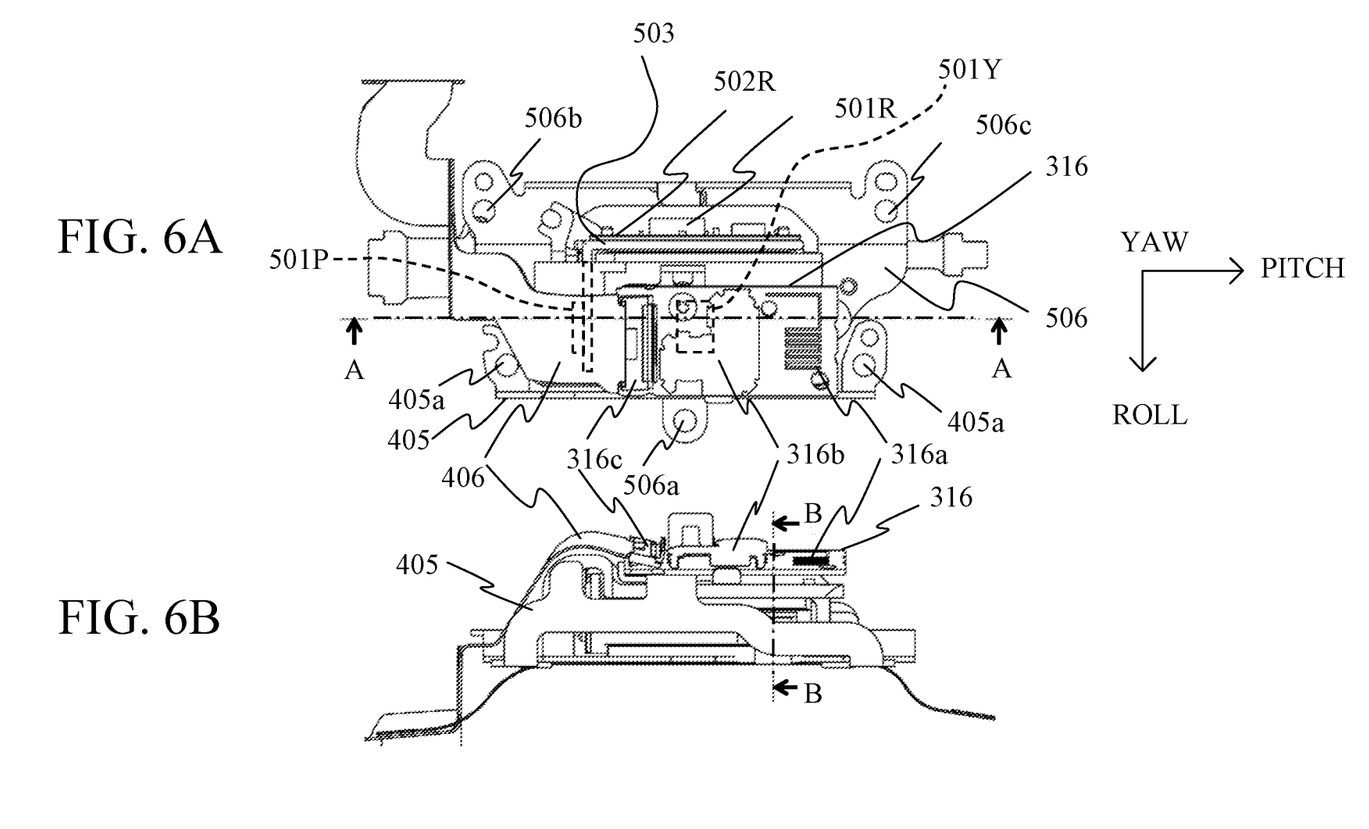
FIGS. 6A to 6D illustrate a wireless communication unit and a shake detection unit included in the camera of Embodiment 1.
Figure 6C:
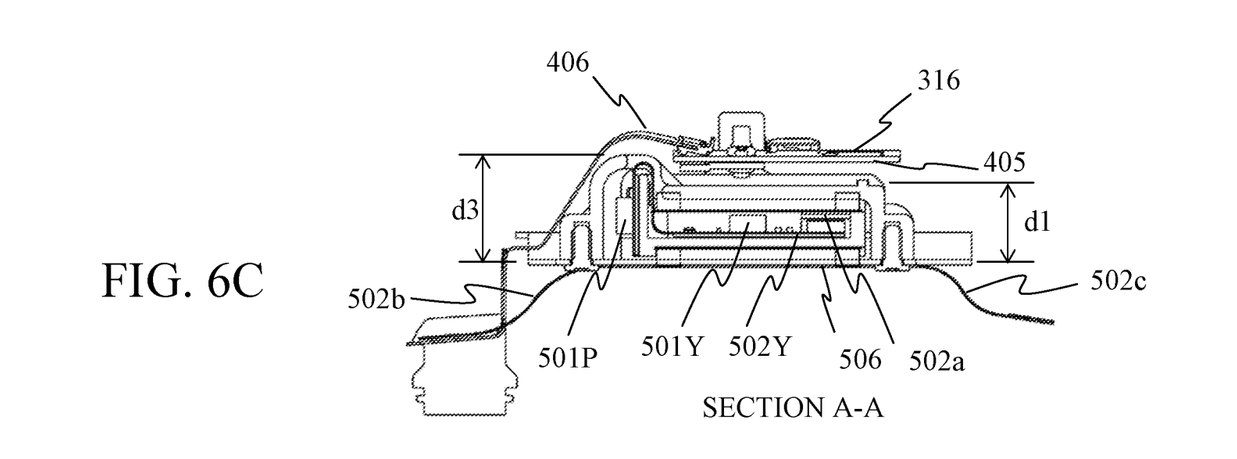
Figure 6D:
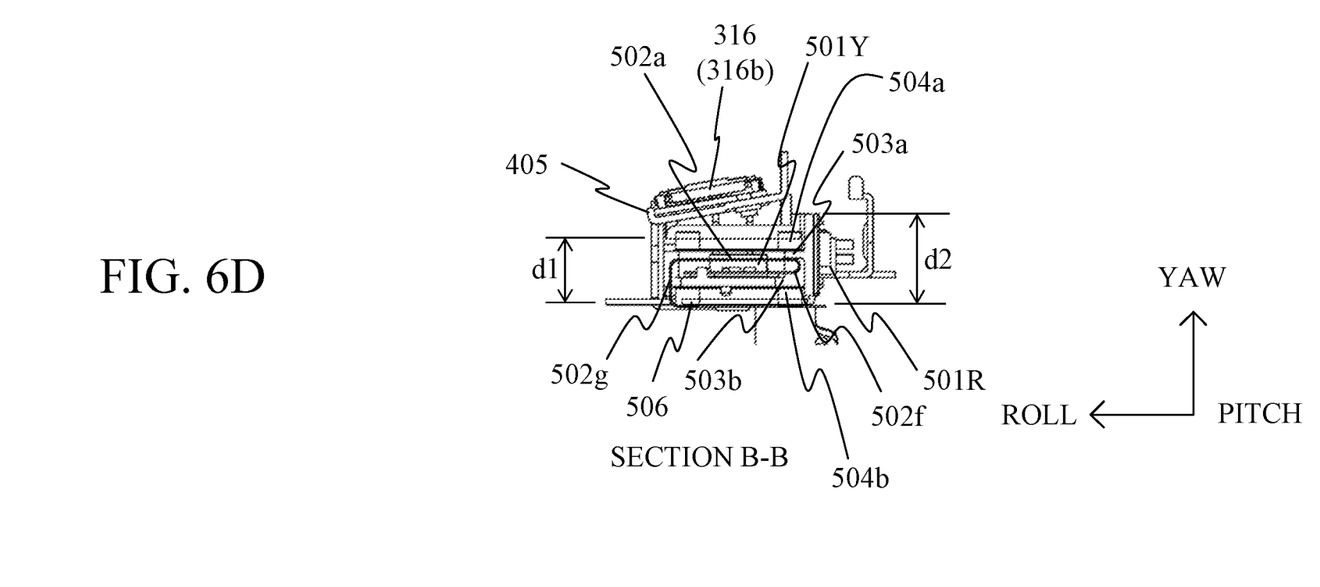

FIGS. 6 A and 6 B respectively illustrate the communication unit 316 and the shake detection unit 320 fixed to the top cover unit 110 as viewed from top and from a side of the camera 100. FIG. 6C illustrates a section along an A-A line in FIG. 6A. FIG. 6D illustrates a section along a B-B line in FIG. 6B.

As illustrated in FIG. 6D, the extending portion 502a of the first flexible substrate 502 includes a first U-bent portion 502f bent in a U-shape at the vicinity of a portion connected to the yaw island 502Y, and a second U-bent portion 502 g bent in a U-shape at the vicinity of the extending portions 502b and 502c. FIG. 5A illustrates the first U-bent portion 502f and the second U-bent portion 502g before being bent into the U-shape. A portion between the first U-bent portion 502f and the second U-bent portion 502g is formed thin, and is held so as not to touch portions other than the cushioning member 504a.

As illustrated in FIG. 6C, the extending portions 502b and 502c are fixed to a lower surface of the second pressing member 506 with a double-sided tape or the like. The shutter vibration is transmitted to the main body 120 and the substrate on which the system controller 307 is mounted, and is further transmitted to the connection terminal of the flexible substrate 502 via a relay substrate (not illustrated). Further, since fixing hole portions 506a, 506b and 506c of the second pressing member 506 are screwed to the top cover unit 110, the shutter vibration is transmitted to the second pressing member 506 via the main body 120 and the top cover unit 110. The shutter vibration is transmitted from the extending portions 502b and 502c to the extending portion 502a. However, this shutter vibration is attenuated between the first U-bent portion 502g and the first U bent portion 502f, and thereby the shake detection unit 320 can correctly detect the camera shake.

As illustrated in FIGS. 6D and 5A, the holding member 503 has a wall portion (contact limiting portion) 503a located between the first U-bent portion 502f and the first cushioning member 504a. The wall portion 503a limits contact of the first U-bent portion 502f with the first cushioning member 504a.

The holding member 503 is maintained in posture by a balance between a pressure from the first cushioning member 504a and a pressure from the second cushioning member 504b, the pressures being applied to the holding member 503 from above and below. This balance is maintained by changing the pressures from the first and second cushioning members 504a and 502b substantially equally even though external environment such as temperature changes.

However, in a case where a pressure is mutually applied between the first U-bent portion 502f and the first cushioning member 504a, when the balance between the pressures from above and below is lost due to a change in external environment, the relative angle between the holding member 503 holding the gyro sensors 501Y, 501R and 501P and the camera 100 changes, which deteriorates image stabilization accuracy. On the other hand, this embodiment adopts the above-described configuration, which makes it possible to reduce a decrease in image stabilization accuracy due to the change in external environment.

The holding member 503 includes an opening portion 503b facing an area between the yaw holding surface 503Y that holds the yaw island 502Y and the wall portion 503a. The opening 503b accommodates the first-U bent portion 502f. Forming this opening portion 503b makes it possible to increase a bending radius of the first U-bent portion 502f, which can improve assemblability of the shake detection unit 320.

The communication unit 316 is fixed to a fixing member 405. The fixing member 405 has a fixing hole portion 405a, and is screwed to the top cover 111. In FIG. 6C, the communication unit 316 is disposed so as to be aligned with respect to the gyro sensor 501Y in a direction (hereinafter referred to as "a detection axis direction) in which the angular velocity detection axis of the gyro sensor 501Y extends. In other words, the communication unit 316 and the gyro sensor 501Y are arranged so as to be aligned in the yaw axis direction.

As illustrated in FIG. 6A, the communication unit 316 is disposed, when viewed from the yaw axis direction, at a position at which the communication unit 316 overlaps the gyro sensor 501Y and does not overlap the gyro sensors 501R and 501P. As a result, as illustrated in FIGS. 6C and 6D, a size (height) d1 in the yaw axis direction of an area of the shake detection unit 320 where the gyro sensor 501Y overlaps the communication unit 316 when viewed from the yaw axis direction becomes smaller than heights d2 and d3 in the yaw axis direction of an area of the shake detection unit 320 where the gyro sensors 501R and 501P do not overlap the communication unit 316 when viewed from the yaw axis direction. With such an arrangement, the communication unit 316 and the shake detection unit 320 can be accommodated in a smaller accommodation area S.

Further, as illustrated in FIG. 6C, the extending portion 502a of the first flexible substrate 502 is disposed so as to pass through a space surrounded on three sides by the communication unit 316, the gyro sensor 501Y and the yaw island 502Y (in other words, a space that is located between the communication unit 316 and the yaw island 502Y, and is different from an area where the gyro sensor 501Y is disposed). Disposing the extending portion 502a as described above makes it possible to accommodate the communication unit 316 and the shake detection unit 320 including the first flexible substrate 502 more compactly in the accommodation area S.

Furthermore, as illustrated in FIG. 6A, the communication unit 316 includes, in order from a side farther from the gyro sensor 501P, an antenna unit 316a, a communication controller 316b that controls wireless communication via the antenna unit 316a, and a connector unit 316c. A second flexible substrate 406 is connected to the connector portion 316c. The second flexible substrate 406 passes above the gyro sensor 501P, and is connected to the system controller 307. With such a configuration, as illustrated in FIGS. 6A to 6C, it is possible to create a space for disposing the second flexible substrate 406 above the gyro sensor 501P.

The fixing member 405 is made of a material having a high thermal conductivity such as aluminum. The second pressing member 505 is made of a material having a low thermal conductivity such as plastic. As illustrated in FIGS. 5A and 5B, the first cushioning member 504a has a rectangular frame shape when viewed from the yaw axis direction. As illustrated in FIG. 6D, the first cushioning member 504a is disposed such that a space inside the rectangular frame shape faces the communication unit 316 (communication controller 316b) and the gyro sensor 501Y that is a gyro sensor closest to the first cushioning member 504a. That is, an air layer is provided between the gyro sensor 501Y and the communication unit 316.

If the temperature of the gyro sensor 501Y changes significantly depending on the temperature of the camera 100, the output from the gyro sensor 501Y fluctuates, which is not desirable in image stabilization control. However, the communication unit 316 (particularly the communication controller 316b) disposed near the gyro sensor 501Y generates heat and becomes hot due to performing communication. Therefore, in this embodiment, the communication unit 316 is fixed to the fixing member 405 made of a material having a high thermal conductivity, so that the heat generated by the communication unit 316 is efficiently dissipated. Moreover, making the second pressing member 505 using a material having a low thermal conductivity and further providing the above-described air layer makes it possible that the heat generated by the communication unit 316 is unlikely to be transmitted to the gyro sensor 501Y. Thus, even during communication, good image stabilization control can be performed.

In this embodiment, the first cushioning member 504a has a rectangular frame shape. However, the first cushioning member 504a may have another shape as long as capable of forming the above-described air layer. Further, as described above, since it is better to balance the pressures applied to the holding member 503 from above and below, it is desirable that the second cushioning member 504b have the same shape as that of the first cushioning member 504a.

The second pressing member 506 and the fixing member 405 are screwed to the top cover unit 110 in directions facing each other, and the fixing hole portions 506a, 506b and 506c of the second pressing member 506 and the fixing hole portion 405a of the fixing member 405 are arranged so as not to be close to each other. The heat generated in the communication unit 316 is transmitted to the top cover unit 110 via the fixing member 405, and is transmitted from the top cover unit 110 to the shake detection unit 320. However, the above-described arrangement of the second pressing member 506 and the fixing member 405 makes it possible to secure a long heat transfer path from the fixing member 405 to the second pressing member 506 on the top cover unit 110, which makes it possible to perform good image stabilization control even during communication.

This embodiment has described the case where the communication unit 316 is disposed so as to be aligned with respect to the gyro sensor 501Y in the detection axis direction of the gyro sensor 501Y. However, the communication unit 316 may be disposed so as to be aligned with respect to the gyro sensor 501P or gyro sensor 501R in the detection axis direction thereof. Further, this embodiment has described the case where the first and second pressing members 505 and 506, the first and second cushioning members 504a and 504b and the holding member 503 are arranged so as to be aligned in the detection axis direction of the gyro sensor 501Y. However, the first and second pressing members 505 and 506, the first and second cushioning members 504a and 504b and the holding member 503 may be arranged so as to be aligned in the detection axis direction of the gyro sensor 501P or the gyro sensor 501R.

As illustrated in FIGS. 6B and 6C, an image capturing optical axis-side surface of the antenna portion 316a of the communication unit 316 is disposed at a position farther from the image capturing optical axis 600 than an image capturing optical axis-side surface of the gyro sensor 501Y. That is, the antenna portion 316a is disposed on an exterior side further than the gyro sensor 501Y. Disposing the antenna portion 316a at such a position makes it possible to reduce a risk that communication performance of the antenna portion 316a is hindered by the gyro sensor 501Y which is an electric element including a metal portion thereinside.

Further, an image plane side-surface of the antenna portion 316a of the communication unit 316 is disposed on the object side further than an image plane side-surface of the gyro sensor 501R. That is, the antenna portion 316a is disposed on the exterior side further than the gyro sensor 501Y. Disposing the antenna portion 316a in this way makes it possible to reduce the risk that the communication performance of the antenna portion 316a is hindered by the gyro sensor 501R including the metal portion thereinside.

Embodiment 2

Figure 7A:
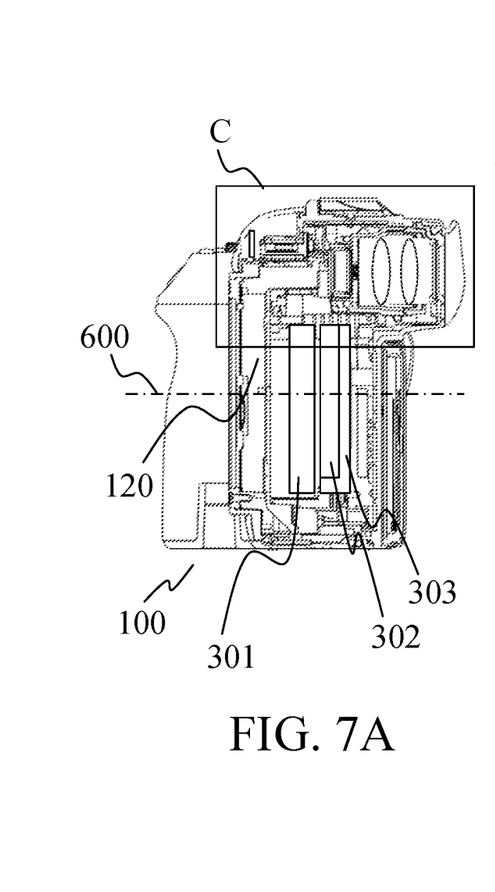
FIGS. 7A and 7B are sectional views of a camera that is Embodiment 2 of the present invention.
Figure 7B:
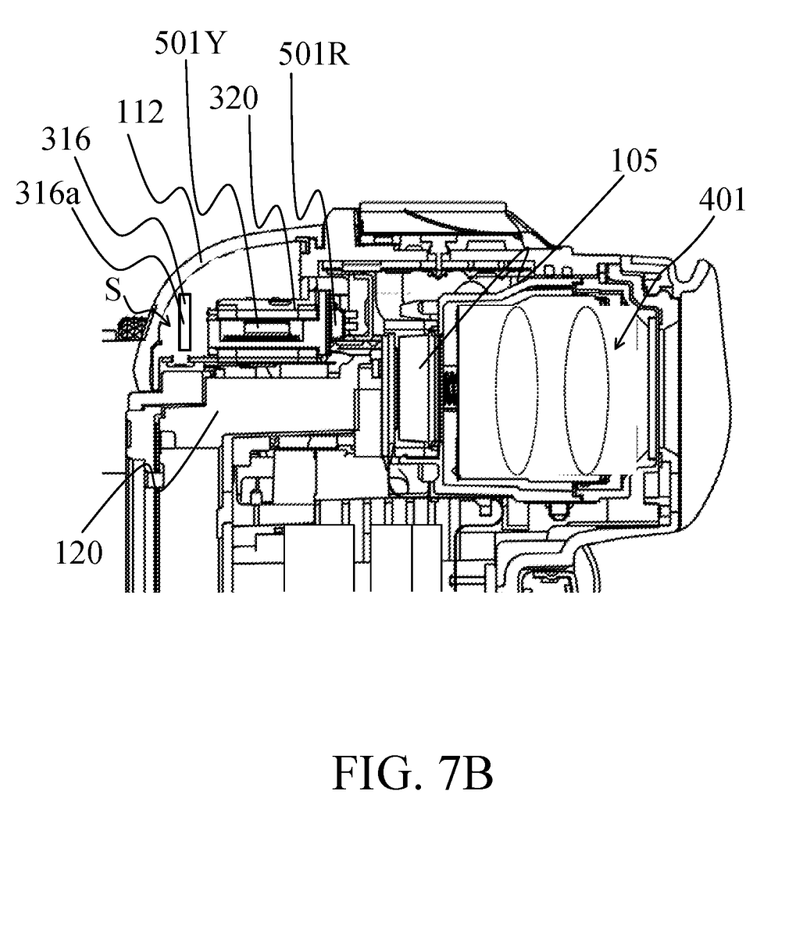

Next, description will be made of a camera 100 that is a second embodiment (Embodiment 2) with reference to FIGS. 7A and 7B. FIG. 7A illustrates a section of the assembled camera 100 cut along the image capturing optical axis 600. FIG. 7B illustrates a part C in FIG. 7A in an enlarged manner.

As illustrated in these figures, also in this embodiment, as in Embodiment 1, the communication unit 316 and the shake detection unit 320 are accommodated in the same accommodation area S surrounded on three sides by the main body 120, the antenna cover 112 and the viewfinder 401 (or the viewfinder display 105). The accommodation area S is an area surrounded by the top cover 111 that covers a portion of the camera 100 except the communication unit 316 and the shake detection unit 320, and an antenna cover 112 that is attached to the top cover 111 to cover the communication unit 316 and the shake detection unit 320.

Furthermore, the communication unit 316 and the shake detection unit 320 are disposed in the accommodation area S that is an upper front area in the camera 100, the area being located on the object side further than the viewfinder 401 and being farther from the image capturing optical axis 600 than the main body 120.

In the accommodation area S, the communication unit 316 is disposed so as to be aligned with respect to the gyro sensor 501R in the detection axis direction of the gyro sensor 501R, and is screwed to the top cover unit 110 via a holder (not illustrated). The communication unit 316 has the antenna portion 316a thereinside.

As illustrated in these figures, an image plane-side surface of the antenna portion 316a of the communication unit 316 is disposed at a position farther from an image plane-side surface of the gyro sensor 501R. That is, the antenna portion 316a is disposed on an exterior side further than the gyro sensor 501R. Disposing the antenna portion 316a at such a position makes it possible to reduce a risk that communication performance of the antenna portion 316a is hindered by the gyro sensor 501R which is an electric element including a metal portion thereinside.

Embodiment 1 has described the case where the antenna portion 316a of the communication unit 316 is disposed so as to be aligned with respect to the gyro sensor 501Y in the detection axis direction of the gyro sensor 501Y. Further, Embodiment 2 has described the case where the antenna portion 316a of the communication unit 316 is disposed so as to be aligned with respect to the gyro sensor 501R in the detection axis direction of the gyro sensor 501R. However, the antenna portions 316a may be disposed so as to be aligned with respect to the gyro sensor 501P in the detection axis direction of the gyro sensor 501P.

Moreover, Embodiment 2 has described, as Embodiment 1, the case where the first and second pressing members 505 and 506, the first and second cushioning members 504a and 504b and the holding member 503 are arranged so as to be aligned in the detection axis direction of the gyro sensor 501Y. However, the first and second pressing members 505 and 506, the first and second cushioning members 504a and 504b and the holding member 503 may be arranged so as to be aligned in the detection axis direction of the gyro sensor 501P or the gyro sensor 501R.

According to each of the above embodiments, the shake detection unit and the communication unit can be compactly arranged in the image capturing apparatus, and the shake detection and the wireless communication can be performed satisfactorily.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2019-233631, filed on Dec. 25, 2019 and 2020-172038, filed on Oct. 12, 2020 which are hereby incorporated by reference herein in their entirety.

What is claimed is:

1. An image capturing apparatus configured to capture an image of an object, comprising:
   a communication unit configured to perform wireless communication;
   a shake detection unit including a first sensor configured to detect shake of the image capturing apparatus around a first axis; and
   a flexible substrate on which the first sensor is mounted,
   wherein the first sensor and the communication unit are arranged in a direction in which the first axis extends,
   wherein the flexible substrate includes an extending portion that extends from a mount surface on which the first sensor is mounted, and
   wherein the extending portion extends in a space between the communication unit and the mount surface, the space being different from an area where the first sensor is disposed.

2. The image capturing apparatus according to claim 1, wherein the communication unit and the shake detection unit are both disposed in a same accommodation area provided in the image capturing apparatus.

3. An image capturing apparatus configured to capture an image of an object, comprising:
   a communication unit configured to perform wireless communication; and
   a shake detection unit including:
      a first sensor configured to detect shake of the image capturing apparatus around a first axis; and
      a second sensor configured to detect shake of the image capturing apparatus around a second axis orthogonal to the first axis,
      wherein the first sensor and the communication unit are arranged in a direction in which the first axis extends, and
      wherein, when viewed from a first direction in which the first axis extends,
         the first sensor is disposed at a position where the first sensor overlaps the communication unit, and
         the second sensor is disposed at a position where the second sensor does not overlap the communication unit.

4. The image capturing apparatus according to claim 3, wherein, of the shake detection unit, a part in which the first sensor overlaps the communication unit is smaller in size in the first direction than a part in which the second sensor does not overlap the communication unit.

5. The image capturing apparatus according to claim 3, wherein:
   the communication unit includes an antenna portion and a connector portion; and
   the antenna portion is disposed at a position farther from the second sensor than the connector portion.

6. The image capturing apparatus according to claim 3, wherein the second axis is parallel to an image capturing optical axis.

7. The image capturing apparatus according to claim 3, wherein the communication unit and the shake detection unit are both disposed in a same accommodation area provided in the image capturing apparatus.

8. The image capturing apparatus according to claim 7, further comprising:
   a first exterior member covering a portion of the image capturing apparatus except the communication unit and the shake detection unit; and
   a second exterior member attached to the first exterior member and covering the communication unit and the shake detection unit,
   wherein the accommodation area is surrounded by the first exterior member and the second exterior member.

9. The image capturing apparatus according to claim 7, further comprising a viewfinder allowing object observation,
   wherein the accommodation area is provided on the object side further than the viewfinder.

10. The image capturing apparatus according to claim 9, further comprising a second exterior member covering the communication unit and the shake detection unit of the image capturing apparatus,
    wherein the accommodation area is surrounded by the second exterior member and the viewfinder.

11. The image capturing apparatus according to claim 7, wherein the accommodation area is provided at a position farther from an image capturing optical axis than a structural member of the image capturing apparatus.

12. The image capturing apparatus according to claim 7, wherein the accommodation area is located away from an image capturing optical axis, and
    wherein, in the accommodation area, at least one of the following conditions is satisfied:
       a) an image capturing optical axis-side surface of the communication unit is disposed at a position farther from the image capturing optical axis than an image capturing optical axis-side surface of the shake detection unit; and b) an image plane-side surface of the communication unit is disposed on an object side further than an image plane-side surface of the shake detection unit.

13. An image capturing apparatus configured to capture an image of an object, comprising:

a communication unit configured to perform wireless communication; and a shake detection unit including a sensor configured to detect shake of the image capturing apparatus wherein the communication unit and the shake detection unit are both disposed in a same accommodation area provided in the image capturing apparatus, the accommodation area being located away from an image capturing optical axis, wherein, in the accommodation area, at least one of the following conditions is satisfied:

a) an image capturing optical axis-side surface of the communication unit is disposed at a position farther from the image capturing optical axis than an image capturing optical axis-side surface of the shake detection unit; and b) an image plane-side surface of the communication unit is disposed on an object side further than an image plane-side surface of the shake detection unit, wherein, in the shake detection unit, the sensor is mounted on a flexible substrate, wherein the shake detection unit includes:

a holding member that holds the sensor;

a first cushioning member and a second cushioning member that are disposed so as to sandwich the holding member; and a base member that holds the holding member via the first and second cushioning members, and is fixed to the image capturing apparatus, wherein the flexible substrate includes an extending portion that extends from a mount surface on which the sensor is mounted, and the extending portion includes a U-bent portion that is bent in a U-shape between the holding member and the first cushioning member, and wherein the holding member includes a contact limiting portion that limits contact of the U-bent portion with the first cushioning member.

14. The image capturing apparatus according to claim 13, wherein the holding member includes an opening portion that faces an area between the mount portion and the contact limiting portion, and accommodates the U-bent portion.

15. The image capturing apparatus according to claim 13, wherein:

the communication unit includes a communication controller configured to control the wireless communication; and the first cushioning member has a shape forming an air layer between the communication controller and the sensor.

16. The image capturing apparatus according to claim 13, further comprising a fixing member that is used for fixing the communication unit to the image capturing apparatus, wherein a material of the fixing member has a higher thermal conductivity than that of a material of the base member.

17. An image capturing apparatus configured to capture an image of an object, comprising:

a communication unit configured to perform wireless communication; and a shake detection unit including:

a first sensor configured to detect shake of the image capturing apparatus around a first axis; a second sensor configured to detect shake of the image capturing apparatus around a second axis orthogonal to the first axis; and a third sensor configured to detect shake of the image capturing apparatus around a third axis orthogonal to the first axis and the second axis, wherein the communication unit and the shake detection unit are both disposed in a same accommodation area provided in the image capturing apparatus, the accommodation area being located away from an image capturing optical axis, wherein, in the accommodation area, at least one of the following conditions is satisfied:

a) an image capturing optical axis-side surface of the communication unit is disposed at a position farther from the image capturing optical axis than an image capturing optical axis-side surface of the shake detection unit; and b) an image plane-side surface of the communication unit is disposed on an object side further than an image plane-side surface of the shake detection unit, wherein the first sensor and the communication unit are arranged in a direction in which the first axis extends, and wherein, when viewed from a first direction in which the first axis extends, the first sensor is disposed at a position where the first sensor overlaps the communication unit, and the second sensor and the third sensor are disposed at positions where the second sensor and the third sensor do not overlap the communication unit.

18. The image capturing apparatus according to claim 17, wherein the second axis is parallel to the image capturing optical axis.

* * * * *